(12) United States Patent
Mikkelsen

(10) Patent No.: US 9,037,273 B2
(45) Date of Patent: May 19, 2015

(54) OPERATOR TERMINAL IN A PROCESS CONTROL SYSTEM

(75) Inventor: Christine Mikkelsen, Västerås (SE)

(73) Assignee: ABB RESEARCH LTD., Zurich (CH)

( * ) Notice: Subject to any disclaimer, the term of this patent is extended or adjusted under 35 U.S.C. 154(b) by 874 days.

(21) Appl. No.: 13/265,304

(22) PCT Filed: Jun. 25, 2009

(86) PCT No.: PCT/EP2009/057973
§ 371 (c)(1),
(2), (4) Date: Oct. 19, 2011

(87) PCT Pub. No.: WO2010/121668
PCT Pub. Date: Oct. 28, 2010

(65) Prior Publication Data
US 2012/0041576 A1 Feb. 16, 2012

Related U.S. Application Data

(60) Provisional application No. 61/202,921, filed on Apr. 20, 2009.

(51) Int. Cl.
*G05B 19/418* (2006.01)
*G06F 17/00* (2006.01)
(Continued)

(52) U.S. Cl.
CPC .......... *G05B 19/409* (2013.01); *G05B 23/0272* (2013.01); *G05B 2219/35507* (2013.01)

(58) Field of Classification Search
CPC .......... G05B 23/0272; G05B 23/0267; G05B 19/41875; G05B 23/0235; G05B 23/0294; G05B 2219/35507; Y10S 715/97; Y10S 715/965; Y10S 715/971
See application file for complete search history.

(56) References Cited

U.S. PATENT DOCUMENTS 6,587,108 B1 * 7/2003 Guerlain et al. ............... 345/440
6,901,560 B1 * 5/2005 Guerlain et al. ............... 715/833
(Continued)

FOREIGN PATENT DOCUMENTS

| CA | 2 308 538 A1 | 11/2001 |
|---|---|---|
| CN | 1522419 A | 8/2004 |
| GB | 2 438 028 A | 11/2007 |

OTHER PUBLICATIONS

Brooks et al., "A new method for defining and managing process alarms and for correcting process operation when an alarm occurs", Journal of Hazardous Materials, vol. 115, 2004, UK, pp. 169-174.
(Continued)

*Primary Examiner* — Kenneth Lo
*Assistant Examiner* — Sunray R Chang
(74) *Attorney, Agent, or Firm* — Birch, Stewart, Kolasch & Birch, LLP

(57) ABSTRACT

The present invention relates to a method of enabling an operator to make control or protection related decisions in a process control system, an operator terminal in a process control system as well as to a computer program product for such an operator terminal. The method includes the steps receiving (38) an operator selection of a control object in a view of control objects, selecting (40) a number of data points for a group of control objects including the operator selected control object according to a data point selection criterion, fetching (42) process data values associated with the data points and with different control aspects, and presenting (44) the process data values of on a display, where each data point receives one corresponding presentation axis on which data values of this data point are presented and data values of data points associated with the same control aspect are linked together with a line.

20 Claims, 6 Drawing Sheets

(51) Int. Cl.
*G08B 21/18* (2006.01)
*G08B 23/00* (2006.01)
*G08B 29/02* (2006.01)
*G05B 19/409* (2006.01)
*G05B 23/02* (2006.01)

(56) References Cited

U.S. PATENT DOCUMENTS

| | | | |
|---|---|---|---|
| 6,952,808 B1* | 10/2005 | Jamieson et al. | 715/833 |
| 7,336,278 B2 | 2/2008 | Brooks et al. | |
| 7,443,395 B2* | 10/2008 | Brooks et al. | 345/440 |
| 7,916,140 B2* | 3/2011 | Brooks et al. | 345/440 |
| 2005/0128199 A1 | 6/2005 | Brooks et al. | |
| 2007/0118909 A1 | 5/2007 | Hertzog et al. | |
| 2007/0211057 A1 | 9/2007 | Navratil et al. | |
| 2008/0091390 A1* | 4/2008 | Samardzija et al. | 703/2 |
| 2008/0234840 A1* | 9/2008 | Brooks et al. | 700/29 |
| 2008/0244449 A1* | 10/2008 | Morrison et al. | 715/810 |

OTHER PUBLICATIONS

Brooks et al., "Geometry Unifies Process Control, Production Control and Alarm Management", IEE Computing Control Engineering—Mar. 2004.
Godinho et al., "Prisma—A Multidimensional Information Visualization Tool Using Mutliple Coordinated Views", 11th International Conference Information Visualization (IV'07).
Siirtola et al., "Interacting with parallel coordinates" Interacting with Computers, vol. 18, 2006, pp. 1278-1309.

* cited by examiner

OPERATOR TERMINAL IN A PROCESS CONTROL SYSTEM

CROSS-REFERENCE TO RELATED APPLICATIONS

This application is the National Phase of PCT International Application No. PCT/EP2009/057973, filed on Jun. 25, 2009, which claims priority under 35 U.S.C. 119(e) to U.S. Provisional Application No. 61/202,921, filed on Apr. 20, 2009.

FIELD OF THE INVENTION

The present invention generally relates to operator terminals in process control systems. More particularly the present invention relates to a method of enabling an operator to make control or protection related decisions in a process control system, an operator terminal in a process control system as well as to a computer program product for such an operator terminal.

BACKGROUND

The term parallel coordinates is used for a way of visualizing high-dimensional geometry and analyzing multivariate data. This visualization is often used to find relationships in statistical data like population in relation to age and unemployment etc. Parallel coordinates is a graph, where the attributes/variables in a dataset are represented by parallel axes and each item in the dataset is represented by a polygonal line intersecting the parallel axis at the item's value for the corresponding axis. Such a graph can be made interactive, where a user can change the attributes that are represented as well as the order and he can furthermore directly filter the information by using interaction techniques like dragging and/or brushing.

Parallel coordinates for use in presenting business information is described as one of several possible information presenting schemes in CA 2308538.

US 2007/0211057 describes parallel coordinates for disclosing data in relation to production of power. Here time, load, outdoor temperature and price are compared in a parallel axis graph in order to enable analysis of their relationships. Through varying a property of a line in such a graph, such as colour or thickness, a further variable is displayed.

US 2007/0118909 describes the use of parallel coordinates for presenting data in relation to nodes of an Ethernet network. Values of components such as users, applications and nodes are provided on parallel axes and being linked by lines representing connections. The document also mentions that tools exist for allowing an operator to define conditions for alarms to be displayed.

U.S. Pat. No. 7,336,278 describes displaying values of a multi-variable process using parallel axes, where variable values are joined by a line. Each line is representative of an individual operating point or run of the process from a historical record. Also alarms are presented through presenting lines representing alarm limits for the variables.

GB 2438028 describes how quality and process variables of a batch process are displayed using parallel axes. The displayed values each relate to a single batch. Batches can be selected and displayed with differentiation, allowing the relationship of the variables for the specific batch to be visualised. Where a process variable for a batch is displayed as multiple values these values may be plotted against time and the resultant curves for multiple batches overlaid in a single graph. Display differentiation for curves relating to selected batches can be applied. The parallel axis graph and the multiple value curve graph can be simultaneously displayed and the data for the selected batch or batches simultaneously differentiated.

In process control systems such as in control systems for electrical power transmission, there is a problem in that there is a large amount of process control data obtained from the process. Today it is hard for an operator to discern the data that is of relevance to him or her and then especially if there is one or more alarms generated in the system.

SUMMARY OF THE INVENTION

The present invention addresses this situation. The invention is thus directed towards solving the problem of improving user friendliness in relation to presentation of process control data on an operator terminal of a process control system.

One object of the invention is therefore to simplify the selection of data in a process control system in order to be presented via an operator terminal.

This object is according to a first aspect of the invention solved through a method of enabling an operator to make control or protection related decisions in a process control system where process data points providing process data values are presented on a display of an operator terminal, comprising the steps of:
  receiving, in the operator terminal, an operator selection of at least one control object in a view presenting control objects, where each control object is related to at least one corresponding data point and said selected control object is related to more than one data point,
  selecting, by the operator terminal, a number of data points for a group of control objects including said operator selected control object according to a data point selection criterion,
  fetching, by the operator terminal, process data values associated with the selected data points and with different control aspects, and
  presenting said process data values of the data points on the display, where each selected data point receives one corresponding presentation axis on which data values of this data point are presented and data values of data points that are associated with the same control aspect are being linked together with a line between the values on the various parallel axes in the presentation.

This object is according to a second aspect of the invention solved through an operator terminal in a process control system including a display, a user input unit and a control unit, said control unit being configured to
  receive, via the user input unit, an operator selection of at least one control object in a view of control objects, where each control object is related to at least one corresponding data point and said selected control object is related to more than one data point,
  select a number of data points for a group of control objects including said operator selected control object according to a data point selection criterion,
  fetch process data values associated with the selected data points and with different control aspects, and
  present said process data values of the data points on the display, where each selected data point receives one corresponding presentation axis on which data values of this data point are presented and data values of data points that are associated with the same control aspect are being linked together with a line between the values on the various parallel axes in the presentation.

This object is according to a third aspect of the invention solved through a computer program product on a data carrier comprising computer program code configured to cause an operator terminal provided in process control system to, when said computer program code is loaded into the operator terminal receive an operator selection of at least one control object in a view presenting control objects, where each control object is related to at least one corresponding data point and said selected control object is related to more than one data point, select a number of data points for a group of control objects including said operator selected control object according to a data point selection criterion, fetch process data values associated with the selected data points and with different control aspects, and present said process data values of the data points on the display, where each selected data point receives one corresponding presentation axis on which data values of this data point are presented and data values of data points that are associated with the same control aspect are being linked together with a line between the values on the various parallel axes in the presentation.

The present invention has a number of advantages. It provides an easily understandable presentation of process data for an operator through using parallel axes. Selections of process data to be presented is furthermore simplified for the operator and thereby he or she may focus on monitoring the process instead of selecting data points.

BRIEF DESCRIPTION OF THE DRAWINGS

The present invention will in the following be described with reference being made to the accompanying drawings, where FIG. 1 schematically shows a computerized process control system 10, FIG. 2 schematically shows an operator terminal of the present invention, FIG. 3 schematically shows a single-line diagram of an operator terminal in a power transmission system of the present invention, FIG. 4 schematically shows a parallel axis diagram where process control data collected in the system is shown, FIG. 5 schematically shows a parallel axis diagram where process control data and alarm and event data are provided in a common view, FIG. 6 schematically shows a flow chart of a number of method steps being performed in a method according to the invention, and FIG. 7 schematically shows a parallel axis diagram of an alternative way of showing process control data.

DETAILED DESCRIPTION OF THE INVENTION

In the following, a detailed description of preferred embodiments of a method, an operator terminal and a computer program product for enabling an operator to make control related decisions in a process control system.

Figure 1:
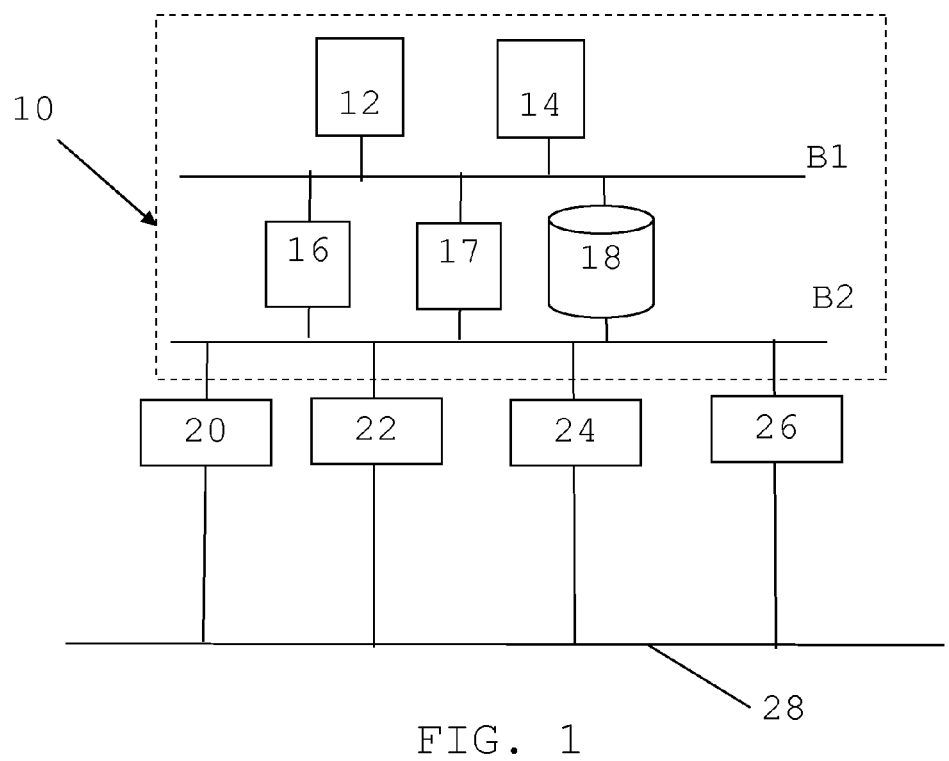

FIG. 1 schematically shows a computerized process control system 10. The system 10 may typically be an object based computerised system for controlling a process or perhaps part of a process. Typical processes are electrical power generation, transmission and distribution processes as well as water purification and distribution processes, oil and gas production and distribution processes, petrochemical, chemical, pharmaceutical and food processes, and pulp and paper production processes. These are just some examples of processes where the system can be applied. There exist countless other processes. The process may be monitored through an operator terminal, which communicates with a control servers handling monitoring and control of the process. One preferred field where the present invention is to be applied is a power transmission system.

In FIG. 1 the system 10 therefore includes a number of operator and engineering terminals 12 and 14 connected to a first bus B1. There is furthermore a second bus B2 and between the first and second busses there are connected a first server 16 providing control of the process, a second server 17 providing monitoring of the process and a database 18 where data relating to control and possibly monitoring of the process is stored. Such data relating to control here comprises process control data, while data relating to monitoring comprises alarm and event data. To the second bus there are furthermore connected process interface units for providing control and measurements in the system 10. The first server 16 is therefore a part of a control system, while the second server 17 is a part of a monitoring system. In the FIG. 1 there are provided four such process interface units 20, 22, 24 and 26 connected to a power line 28. It should here be realized that some of these may only be provided for control, some only for measurements and some for both control and measurements. Such process interface units are thus involved in controlling the electrical power transmission process or measuring properties of the controlled process as well as properties or status of control and measurement units. Process interface units can include elements directed towards measuring system properties such as current, voltage and power measurement units like current transformers and voltage transformers, as well as elements directed towards controlling operation like circuit breakers, relays, power semiconductor switches and tap changers. These are just a few of several different possible types of elements that can be provided in process interface units.

The first server 16 here receives measurements of the process via the process interface units and controls the process via the process interface units based on these measurements. It also stores historical process control data in the history data base 18. The second server 17 receives measurements via the process interface units as well as status data concerning the operation of process interface units and can generate alarm and event data that may be presented via the operator terminals 12 and 14. It can also shut down the process. Also alarm and event data may be stored in the database 18.

In the example of FIG. 1, a so called Network Manager system runs on the process control system 10, which belongs to the group of SCADA (Supervisory Control And Data Acquisition) systems. The Network Manager system is particularly intended for the supervision and control of power transmission systems or gas systems.

Figure 2:
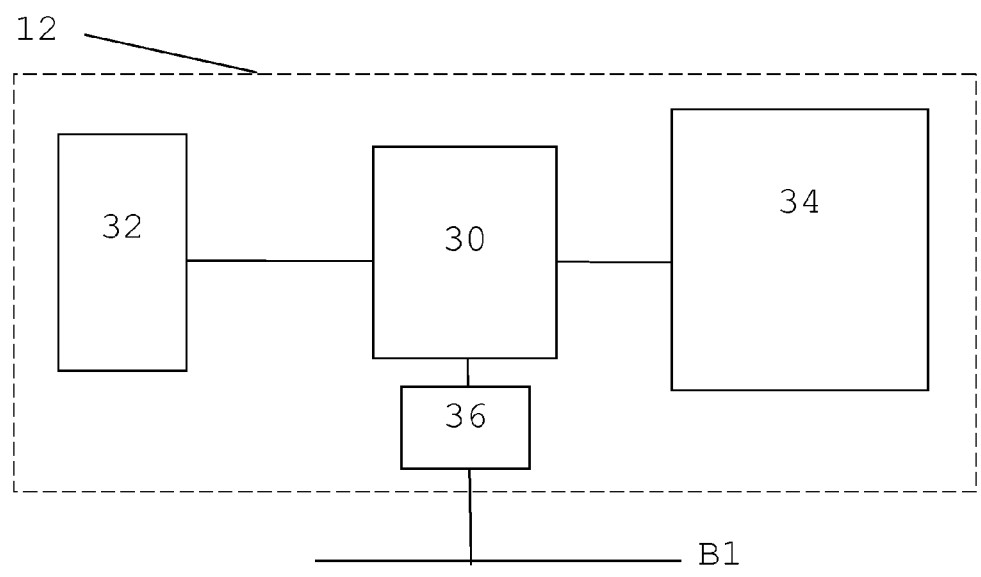

The operator terminals 12 and 14 in the process control system 10 provide each a user interface to the Network Manager system. In the following, the details of such an operator terminal are explained based on the example of operator terminal 12, shown in FIG. 2. The operator terminal 12 includes a user input unit 32, a display 34, a control unit 30 and an interface 36 for communicating with the system 10 via the first bus B1. As mentioned above, the operator terminal provides a graphical user interface for an operator of the control system 10. The control unit 30 may be a processor with an associated program memory including program code for performing the functionality of the present invention, which will be described later on. The user input unit 32 is a unit through which a user of the operator terminal 12 may enter data. As such it may be a keyboard, a keypad or a mouse. It may also be combined with the display 34 in order to form a touch screen. The operator terminal 12 may also include other user interfaces such as a speaker or a microphone in order to present and receive data to and from one or more users of the operator terminal in other ways than through the display and keyboard. Such a user is in the following termed an operator. An operator terminal in a process control system is only one example of a computer in which the present invention may be realized.

Process control data from the various process interface units can be collected and stored in the history data base 18 by the first server 16 as well as presented in real-time to an operator via the display 34.

The first server 16 obtains the large amount of real time measurement data that is saved in the historical data base 18. The graphical user interface of operator terminals 12 or 14 supports the operator to control the system 10, and here in particular a substation shown in FIG. 3.

Figure 3:
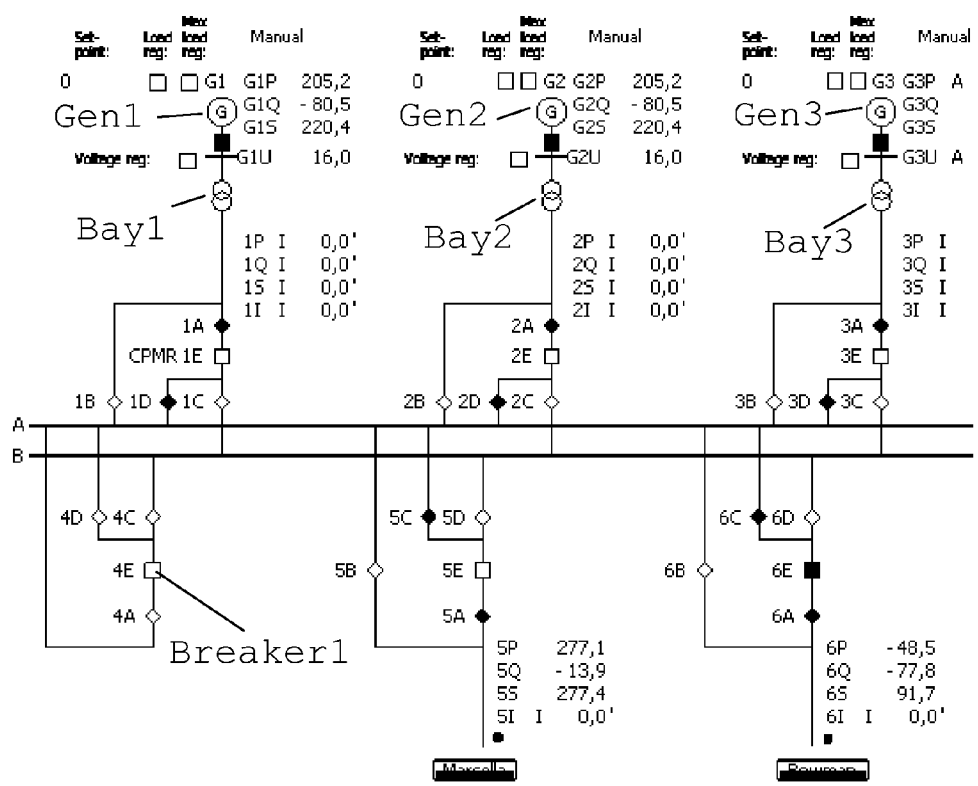

On the operator terminals 12 and 14 there may be shown graphical symbols of the controlled process and process interface units or parts of such process interface units. Thus graphical symbols are shown which may represent process interface units or parts of them as well as parts of the power transmission system, such as power generation plants, power transmission and distribution lines, power transmission control stations, in particular substations, or subparts of all these parts. These graphical symbols thus represent system elements and are furthermore with advantage shown as being interconnected in a control structure used for controlling the process, which structure can be shown in a single line diagram. These system elements are one type of control objects according to the invention. On the display there may also be shown process data, like process control data associated with these various elements. One such representation of the control structure of a part of the power transmission system is shown in FIG. 3, where a substation is visualized together with process control data in the form of measurement data. In such a view there may exist a large amount of measurement and status data.

FIG. 3 shows a single line diagram (SLD) of a substation in a process control system that is here a power transmission system. There is here a first generator Gen1 connected to a pair of power lines A and B via a first transformer bay Bay 1. To these power lines A and B there is also connected a second generator Gen2 via a second transformer bay Bay 2. There is also a third generator Gen3 connected to the power lines A and B via a third transformer bay Bay3. These are all process control elements. There is here also a first circuit breaker Breaker1 connected between the two power lines A and B. In the figure there are further connections leading to other substations, further circuit breakers, points of insulation as well as other elements, which may make up further process control elements. However, these will not be described any further here, since they are not necessary for understanding the invention. The single line diagram of FIG. 3 is thus only an exemplifying diagram shown for exemplifying the present invention. However, the various elements or control objects mentioned above are associated with data points having data values being collected through system elements. An element may here be associated with more than one data point, where each data point provides data values in a value range of the process. A data point can provide process control data such as status data or measurement value data. A circuit breaker may be associated with a status data point that provides data point values, for instance provide status data indicating whether it makes or breaks a connection, while another system element, like a generator, may provide data points in the form of various types of measurement values of the process being controlled, for instance measurement values of the generators Gen1, Gen 2 and Gen 3. In the view in FIG. 3, some such process control values are shown at some of the elements.

The operator terminal may also show an alarm and event list, i.e. a list of alarms and events occurring in the system. These alarms and events are a second type of control objects and may typically relate to the elements shown in a view, such as the elements viewed in FIG. 3, and in many instances relate to process control data values of data points provided by these elements going above or below alarm limits. Here also alarm and event data may be associated with data points such as type and priority, indicating alarm type and priority level of the alarm or event.

There is often a lot of information in process control systems. One problem with this is that the information may be scattered to different places and sometimes also be provided in different views of the graphical representation of the process control system. Another problem is that a control object, such as an alarm or a system element, may be associated with several data points. This is the case with for instance transformers and generators. It is furthermore possible that all data points associated with a system element are not of interest at a certain point in time. This also means that the information, which is of less relevance during a certain control phase, may block or make it harder for an operator to view or take in the importance of more relevant information. It may therefore be hard for an operator to see patterns and outliers in the information, where outliers means values which lie outside the normal value range. Another problem is that the information changes over time and usually the information that is presented in the graphical user interface are the values currently measured but not historical data. There exist different relationships between the information in the system but depending on how the information is represented it is hard for the operator to see those relationships. When there are many data points associated with a control object, it is possible for an operator to directly select data points for presenting. However, this may involve many various selections and operations in the user interface by the operator. Such selections may take away the focus of the operator from what is important, namely to overview the process. It is therefore of interest also to simplify for an operator to select data points to be monitored.

This means that it may be hard for an operator being presented with a system view, such as the one in FIG. 3, to make the right control related decisions, because the relationships between the data values of different data points in the system cannot be readily understood by the operator.

Figure 4:
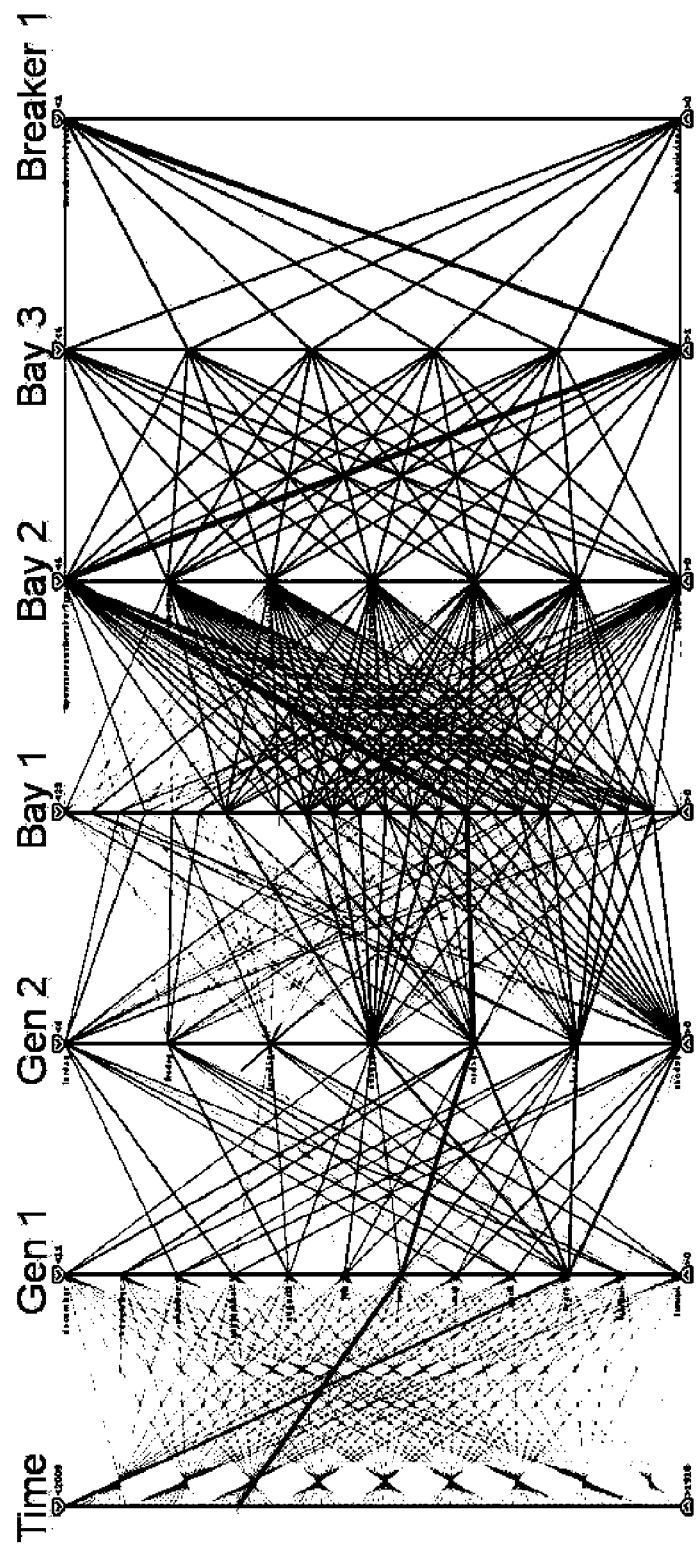

The present invention is directed towards solving this and other related problems. According to one aspect of the invention information is extracted at specific times from the database and presented as data points of interest related to the control of the process in parallel coordinate graphs. The data points may more particularly be process data points such as process control data points like measurements and status data retrieved from process interface units or parts of process interface units used in the process control, where the measurement and status data relate to either the process interface units themselves or to parts of the power transmission system, such as power generation units, power transmission and distribution lines or power transmission control stations, such as substations. Process data points may also be alarms and event data points. The extraction of the information can also be done in real time if the control system 10 supports it. Each process data point thus has a value that is variable. This variable value of a data point is represented by an axis in a parallel coordinate graph. Such a graph is shown in FIG. 4.

In this graph there is shown a first axis Time, a second axis Gen 1, which is associated with the first generator in FIG. 3, a third axis Gen 2 associated with the second generator in FIG. 3, a fourth axis Bay 1 associated with the first transformer bay in FIG. 3, a fifth axis Bay 2 associated with the second transformer bay in FIG. 3, a sixth axis Bay 3 associated with the third transformer bay in FIG. 3 and a seventh axis Breaker 1 associated with the first circuit breaker in FIG. 3. These elements, their data points and the values of these data points are merely exemplifying in order to describe the present invention.

The data from the control system, i.e. values of the above mentioned data points change over time. The data points are therefore time varying.

Since process control data of the control system is time varying the time dependency has to be included in some way. In this case the whole system, or rather the data points in the system selected for presentation, through various parallel axes are linked together through lines. This means that the values of each presented data point at a specific point in time are linked together by a line in the parallel coordinate graph (see the thick line in FIG. 4). For such a line the point in time is a control aspect. The values of the data points can here be values relating to a generator or a transmission line or any other element in the system. Here they are exemplified by transformers, generators and circuit breakers. This means that data points form attributes of a time line, where the data point values are variables of these attributes.

Figure 5:
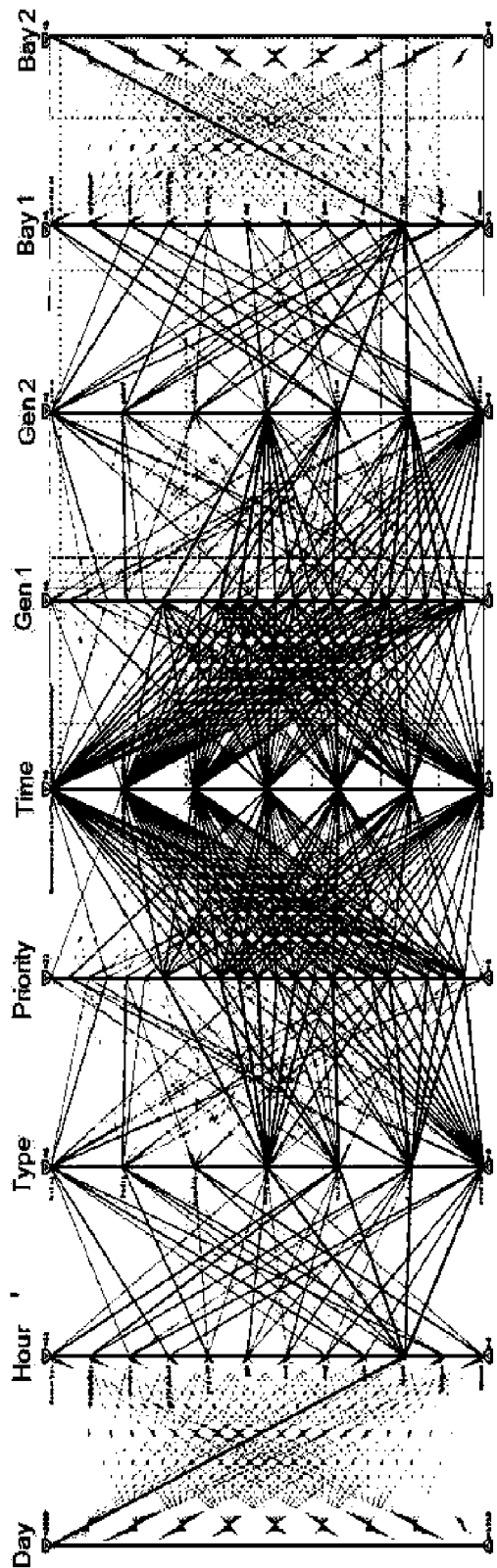

FIG. 5 schematically shows a view of a parallel graph including some of the parallel graph axis data from FIG. 4 with some additional process data, namely alarm and event data selected from an alarm list including control objects in the form of alarms and events. In this graph there are parallel axes for Time, the first generator Gen1, the second generator Gen 2 the first transformer bay Bay 1 and the second transformer bay, Bay 2. These data points are provided on the right side of the diagram. There are here also process data points in the form of alarm and event data points associated with alarm and events from an alarm list, which data points and their values are here shown on the left side of the process control data. There is here a time axis named Day, a time axis named Hour, an alarm and event type axis named Type as well as a priority type axis named Priority. Time is self-explanatory, while Type indicates type of alarm or event and Priority which priority it has in the system.

Figure 6:
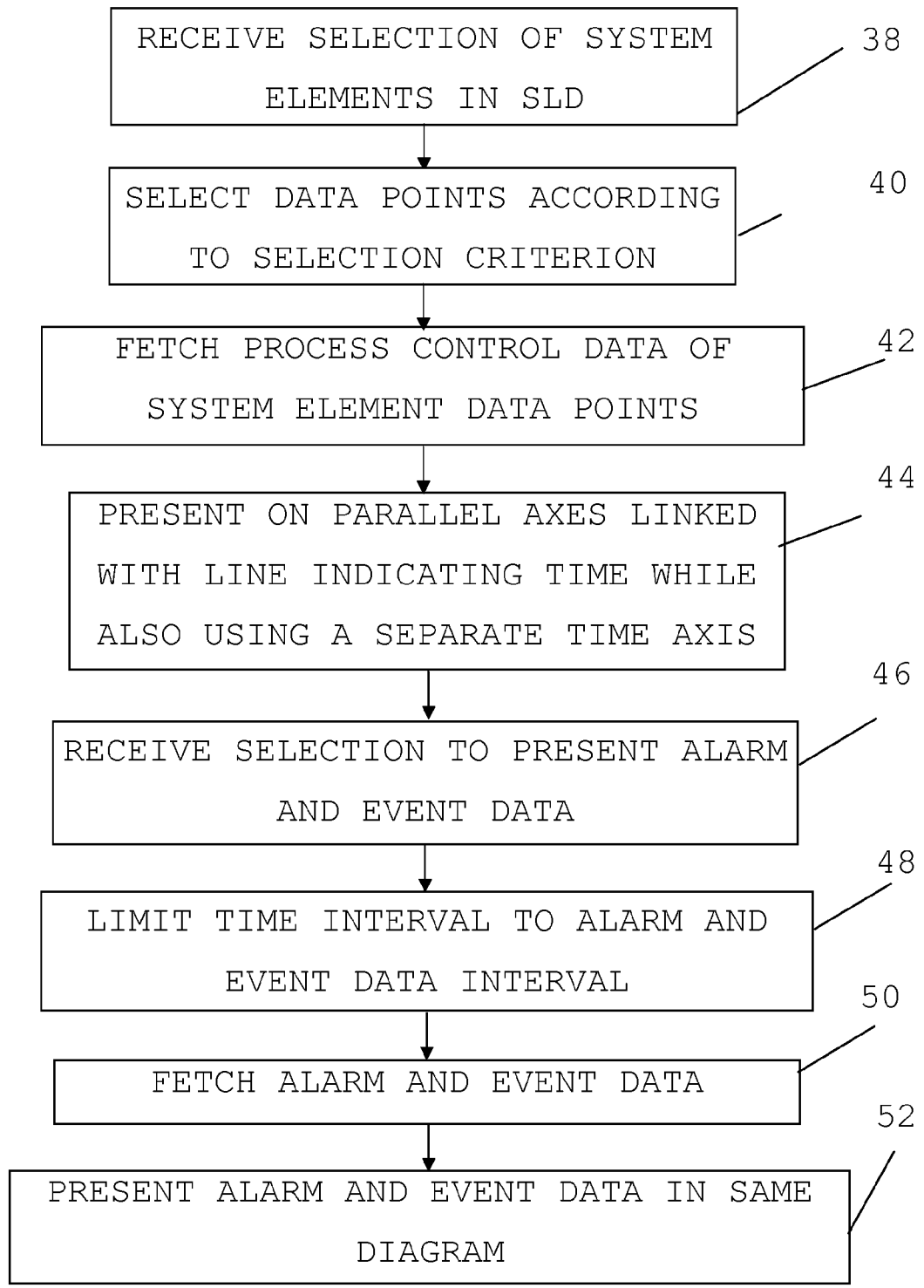

Now a first embodiment of the invention will be described in relation to FIG. 1-5 as well as to FIG. 6 which shows a flow chart of a number of method steps being performed in a method according to a first embodiment of the present invention.

The Network Manager system has at every point in time values for a number of data points in the system. A number of these can be interesting to analyze together. The operator may choose a number N of interesting data points on the display 34 via the keyboard 32. He or she can here select these data points through indicating control objects in the form of elements in the single line diagram in FIG. 3. As an example the operator here chooses the elements Gen1, Bay1, Gen2, Bay2, Bay 3 and Breaker 1 in FIG. 3. Some of these elements may here provide more than one data point. There may thus be several data point types. The selections made by the operator are thus received by the control unit 30, step 38, which then selects a limited number of data points according to a data point selection criterion, step 40.

Thereafter the control unit 30 fetches time varying data of the N data points corresponding to the selected elements from the data base 18 and/or the first server 16, step 42, and presents them in parallel form on the display 34. The control unit thus fetches process control data values associated with the data points and with control aspects, where a control aspect is here a certain point in time. The process control data values are here furthermore provided linked with a line indicating time, i.e. the control aspect, while also providing a separate time axis, step 44. This is schematically shown in FIG. 4. Every selected data point of interest here has its own vertical axis in the parallel coordinate graph, e.g. measured values from a data point representing a generator Gen 1 may have an axis with a kiloVolt (kV) scale as may the other generators and the transformer bays. The graphs may furthermore be normalized. The first circuit breaker Breaker1 provides status data and therefore it only has two states, open and closed. As a result, there are a number N of parallel vertical axes in the graph. In this first embodiment there is also a parallel vertical time axis (Time) that also is plotted with a time scale, which is the case in this first embodiment. In some variations of the invention this axis may be omitted.

The data values of the data points may then be sampled with a time interval, which can be inherited from the system or customized by the user. Then N values of each sample and the time when the data was sampled may be plotted on the corresponding axis and a line between the points is drawn. A point in time may thus be represented by a line, which point in time has a number of attributes and where the attributes are the different values of the data points.

The result is that if the operator chooses to extract time varying data from the system with a cycle time of one minute during one hour he or she will get 60 lines in the graph.

New time lines may furthermore be added to the graph at a configured time interval meaning that as soon as new data values of the data points can be collected in the system either via the server 16 or the database 18 and be shown as a time line in the graph. The graph may thus be updated in real time through adding lines associated with the new points in time in the parallel coordinate graphs. As new data is added old data may also be removed.

From this graph shown in FIG. 4, the operator can filter out interesting information so he can find interesting patterns, relationships and outliers.

The choice of data points according to the data point selection criterion that are represented in the graph can either be defined by the system or operator configurable. This means that according to the selection criterion, the data points selected for presentation may be pre-specified, for instance according to data point type. Therefore, as an operator selects an element the one or more pre-specified data points for this element are presented. This thus means that data points of pre-specified data point types are selected and presented. It is also possible that the operator can change the choice of data points interactively. As an alternative it is possible that the selection criterion is that the system selects one or more data point types, for instance one that has the highest number of associations to operator selected process control elements or one which a majority of the operator selected process control elements are associated with, such as the type voltage. For an element that lacks association with this type, it is then possible that a type that is closest to it is selected. In this variation of the invention the operator would not directly select data point type for presenting. The selection criterion may also be limited to data points providing measurement values.

The order of the data points is important since the relationships between two variables are more easily detected if they are placed next to each other. The order can be either defined by the system or user configurable. It is also possible that the user can change the order of data points interactively.

Another important function is that the user can directly manipulate and filter the graph to change what data that is represented. The user may thus add and remove axes in the graph. This means that the control unit may receive a data point change selection and change the axes being presented according to this data point change selection. In this way an operator may add or remove axes from the graph.

According to this first embodiment of the invention, it is furthermore possible to combine the presentation of process control data with alarm and event data. However, alarm and event data is not time varying since the time is not changed for one alarm. The time is just another attribute for alarm and event data which identifies when the alarm or event occurred.

Every alarm is here an item that is presented with a line in the parallel coordinate graph that has a number of attributes, for example time (that also can be divided in weekday, hour etc.), priority, type etc. These attributes are thus data points of the alarm and event data that can have a range of values. The alarm line intersects the different attribute axes at the points corresponding to that alarm item's values for those attributes. A control aspect is thus here a specific alarm or event.

According to this first embodiment the operator can select, for instance via the keyboard 32, to have an alarm parallel coordinate graph to be presented in relation to the process control data, either in same view with the process control data graph and with the same time intervals as in FIG. 5 or in another screen or view.

However the parallel coordinate graph of the alarm and event data is coordinated with the parallel coordinate graph of the control system data. They therefore share a common attribute provided as an axis in a parallel axis scheme, namely time. As the operator therefore selects one or more control objects in the form of alarm and event objects, which may be done through selections in an alarm list, these selections are then received by the control unit 30 of the operator terminal, step 46, which then goes on and limits the time axis used to the time interval of the selected alarm and event data time interval, step 48. This is here done for both the graphs, the process control data graph and the alarm and event data graph. The control unit 30 then fetches data values of the data points associated with these control objects, i.e. the alarm and event data from the history database 18 and/or the second server 17, step 50, and thereafter presents the alarm and event data values on the display 34, step 52. In this embodiment it presents the alarm and event data in the same view as the process control data, as is shown in FIG. 5. It here links the graphs to each other through connecting lines of alarms and events generated at a certain point in time to process control data of the same point in time. This also means that for alarms and events, the specific alarm or event is a control aspect.

It is also here possible that new data may be added as it occurs in the network.

The operator may here select to filter the information in one of the parallel coordinate graphs in one time interval. The control unit 30 will then automatically filter the other graph to show the data with a matching time. It may also remove process control data that is not related to any selected alarms or events. This is another data point limitation criterion.

The operator can as an example see from the alarm parallel coordinate graph that there are a large number of high priority alarms on Mondays. He or she can then filter the alarm items to only show those alarms. He or she can then see that the most alarms happen during the time interval 08.00 am to 10.00 am. He or she may then filter the alarms to only show the alarms during that time period. Now all high priority alarms during Mondays between 08-10 am may be shown in the alarm parallel coordinate graph. If the user has a coordinated parallel coordinate graph for the control system data the only items that matches the time of the alarms that is left in the other view is shown. The operator can then analyze the parallel coordinate graph for the control system data to find relationships. Maybe the alarms seem to be connected to a certain value of a transmission line at the same time when a generator has a certain value?

According to one variation of the invention, values of data points in a process control system are extracted and presented directly, i.e. online, in parallel coordinates. According to another variation of the invention there are provided different interaction techniques for selecting the kind of data points that are presented in the parallel coordinate graph. The user can for example drag data points directly from the single line diagram shown in FIG. 3 and add them to the parallel coordinate graph. He or she can also convert trending views in the system to a parallel coordinate graph. These are thus examples of data point change selections. He or she can also create a parallel coordinate graph directly from an alarm list. If this is done, it is then possible to combine this with simultaneously showing process control data in another graph through operator selection of elements in a single line diagram. If this is done, the control unit may then apply a data point selection criterion on the process control data point, through only selecting the data points of operator selected elements that are related to the presented alarms and events. If for instance a selected alarm is the exceeding of a voltage level by a transformer bay, it is then possible that only the voltage of this transformer bay is selected by the system for presenting, but not active power, if for instance a transformer element is selected by an operator in the single line diagram in FIG. 3. All data points that are connected to the currently shown alarms may then be presented in a parallel coordinate graph. As mentioned earlier it is possible that two different types of parallel coordinates can be connected together and correlated. This is possible since the alarm items have a time attribute and the control system parallel coordinate also has a time attribute that corresponds to the time when the data was sampled. By doing this a parallel coordinate graph with alarm items can be connected to a parallel coordinate graph with time varying control system data. The result is that the operator can analyze alarms and events together with control system data to find relationships and the cause of the alarms.

In a further embodiment of the invention, several lines which happen to follow the same graphical path may be grouped together to form a new line in order to reduce the complexity of graphical information shown in the parallel coordinate graph. This function may be called clustering. For example, in case of the alarm parallel coordinate graph, several alarms occurring at the same point in time and thereby falling together in the parallel coordinate graph, i.e. following the same graphical path, can be clustered to form such a new line. In this case the operator enters a clustering command in relation to lines and the system then combines lines having the same path for forming a common line.

Figure 7:
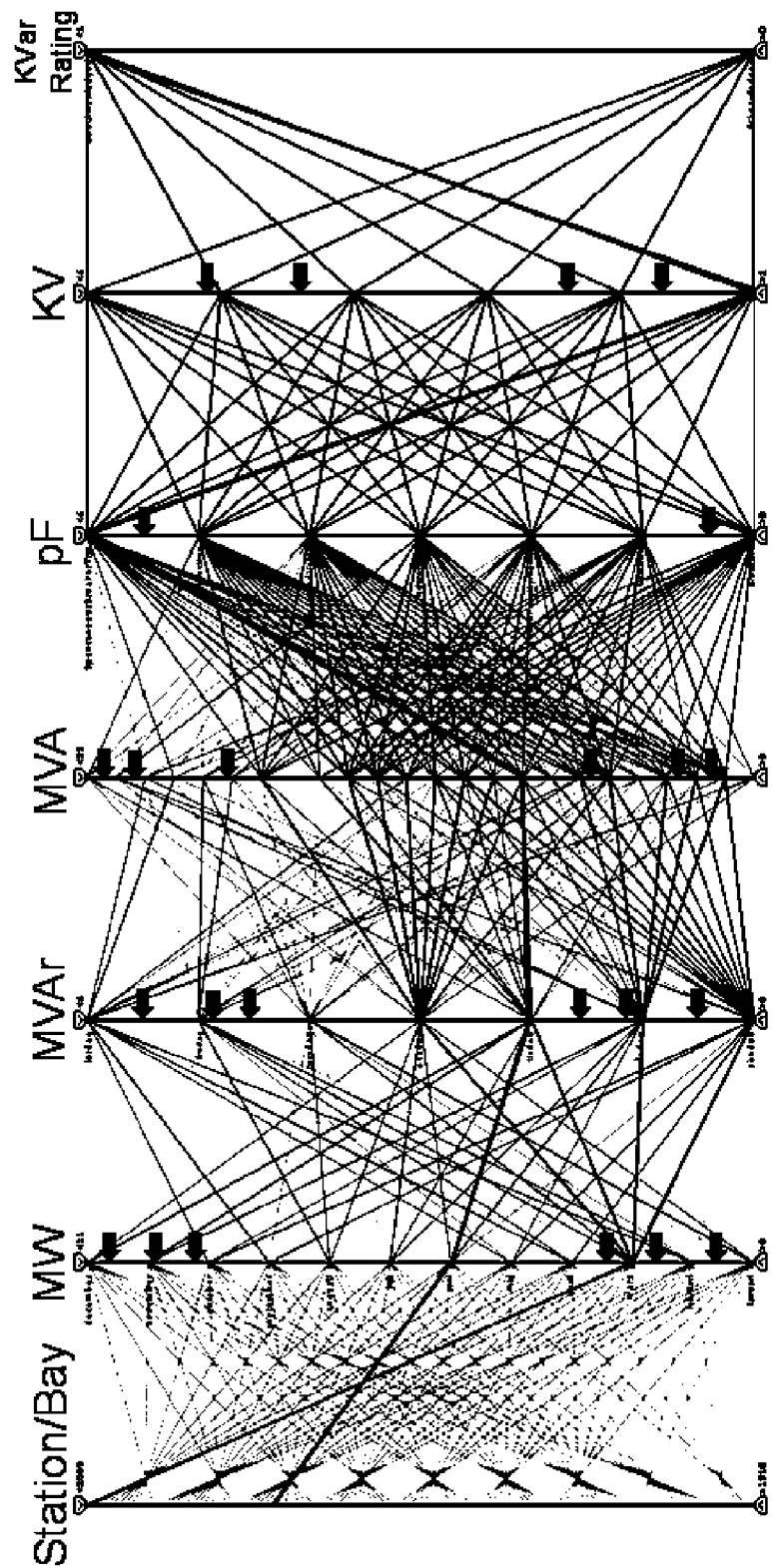

According to another variation of the invention an operator may select an element of a certain type in a single line diagram and then data points relating to other elements of the same type are automatically selected and presented by the system together with the data points of the operator selected element. The data point selection criterion is thus here to select the same type of data points of other elements in the single line diagram that is presented. If for instance the operator selected Bay 1 in FIG. 3, then all transformers at the substation in FIG. 3 or perhaps in a larger geographical area may be selected by the control unit and presented in a parallel axis graph. This is exemplified in FIG. 7, which shows a parallel axis graph, where there is first axis Station/Bay indicating that the selected elements are transformers, and a number of further axes indicating various data points of transformers. Here there is first data point on a second axis MW indicating active power, a second data point on a third axis MVAr indicating reactive power, a third data point on a fourth axis MVA indicating apparent power, a fourth data point on a fifth axis pF indicating power factor, a fifth data point on a sixth axis KV indicating voltage and a sixth data point on a seventh axis KVar Rating indicating reactive power rating. The data values of these data points are then presented for all the elements that are of the same type as the operator selected element, i.e. a selection of for instance a transformer element, would lead to the presenting of the same types of data points for all transformers. Here each line or control aspect represents a control object, which control object in this variation of the invention is a system element and more particularly a process control element, which element is also provided as a point on the first axis Station/Bay.

It is here also possible to add alarm limits for the various data points, which is indicated through arrows in the graph.

It should here be realized that the principles described here may be used for showing data at various control levels of the system, i.e., at levels that are higher and lower than the substation level exemplified here.

The power transmission system in FIG. 1 is simplified in that it is limited to comprise one process control system 10 and one power line 28. However, a system can include several control stations and several power lines. In this case it is possible that control and protection computers as well as operator and engineering operator terminals exist on a higher hierarchical level, a system level.

The operator terminal may, as was previously described, preferably be provided in the form of one or more processors together with computer program memory including computer program code for performing the present invention. This computer program code may also be provided on one or more data carriers which performs the functionality of the present invention when the program code thereon is being loaded in an operator terminal.

The invention claimed is:

1. A method of enabling an operator to make control or protection related decisions in a process control system, where process data points providing process data values are presented on a display of an operator terminal, said method comprising the steps of:

receiving in the operator terminal, an operator selection of at least one control object in the form of at least one process control element presented in a view of system elements interconnected in a control structure, where each control object is related to at least one corresponding data point and said selected process control element is related to more than one data point;

selecting by the operator terminal, a number of data points for a group of control objects including said operator selected process control element according to a data point selection criterion;

fetching by the operator terminal, process data values associated with the selected data points and with different control aspects, where the fetched process data values are process control data values associated with the process control element;

presenting said process data values of the data points on the display, where each selected data point receives one corresponding presentation axis on which data values of this data point are presented and data values of data points that are associated with a common attribute are being linked together with a line between the values on the various parallel axes in the presentation;

receiving in the operator terminal, an operator selection of at least one further control object in the form of an alarm and event object, fetching by the operator terminal, data values of data points associated with the selected alarm and event object; and presenting the data values of the data points of the alarm and event object on a number of parallel axes and each alarm or event object is represented by a corresponding line through each axis, wherein the common attribute is time and said method further comprises the step of linking the alarm and event data point values to corresponding process control data point values via a common time axis.

2. The method according to claim 1, further comprising the step of continuously fetching data point values and presenting them as soon as they are present in the system.

3. The method according to claim 2, further comprising the step of receiving a selection of a data point value presenting range and removing all lines that are outside of this range.

4. The method according to claim 2, further comprising the step of receiving a data point change selection and changing the axes being presented according to said data point change selection.

5. The method according to claim 2, further comprising the steps of receiving a clustering instruction in relation to a number of lines and combining lines following the same path to a common line.

6. The method according to claim 1, further comprising the step of receiving a selection of a data point value presenting range and removing all lines that are outside of this range.

7. The method according to claim 1, further comprising the step of receiving a data point change selection and changing the axes being presented according to said data point change selection.

8. The method according to claim 1, further comprising the steps of receiving a clustering instruction in relation to a number of lines and combining lines following the same path to a common line.

9. The method according to claim 1, wherein the data values being fetched include process control data values obtained in real-time from the process.

10. The method according to claim 1, wherein data points selected for presenting are pre-specified according to the selection criterion.

11. The method according to claim 1, wherein data points selected for presenting are data points that have the highest number of associations with operator selected control objects.

12. The method according to claim 11, where the operator selected control object is a first type of control object and the step of selecting a number of data points according to a selection criterion comprises selecting data points of all control objects of this first type in the view based on the operator selected control object.

13. The method according to claim 1, wherein only one data point is to be presented for a corresponding control object according to the selection criterion.

14. The method according to claim 1, further comprising the step of limiting, by the operator terminal, the time axis of the alarm and event data presentation and the process control data presentation to a time interval defined by a time interval within which the alarm and event data have been generated.

15. The method according to claim 1, further comprising the steps of receiving a user selection of a time interval in which alarm and event data or process control data is to be presented and limiting the presenting of both types of data to the user selected time interval.

16. The method according to claim 1, wherein, according to the selection criterion, the only alarm and event data being presented is data corresponding to the selected process control data points.

17. The method according to claim 1, wherein, according to the selection criterion, the process control data points being selected are only those that are associated with the selected alarm and event data points.

18. The method according to claim 6, further comprising the step of receiving a data point change selection and changing the axes being presented according to said data point change selection.

19. An operator terminal in a process control system including a display, a user input unit and a control unit, said control unit being configured to:
  receive, via the user input unit, an operator selection of at least one control object in the form of at least one process control element presented in a view of system elements interconnected in a control structure, where each control object is related to at least one corresponding data point and said selected process control element is related to more than one data point;
  select a number of data points for a group of control objects including said operator selected process control element according to a data point selection criterion;
  fetch process data values associated with the selected data points and with different control aspects, where the fetched process data values are process control data values associated with the process control element;
  present said process data values of the data points on the display, where each selected data point receives one corresponding presentation axis on which data values of this data point are presented and data values of data points that are associated with a common attribute are being linked together with a line between the values on the various parallel axes in the presentation;
  receive, via the user input unit, an operator selection of at least one further control object in the form of an alarm and event object;
  fetch data values of data points associated with the selected alarm and event object; and
  present the data values of the data points of the alarm and event object on a number of parallel axes, where each alarm or event object is represented by a corresponding line through each axis,
  wherein the common attribute is time and the control unit is further configured to link the alarm and event data point values to corresponding process control data point values via a common time axis.

20. A computer program product on a non-transitory data carrier comprising computer program code configured to cause an operator terminal provided in a process control system to, when said computer program code is loaded into said operator terminal:
  receive an operator selection of at least one control object in the form of at least one process control element presented in a view of system elements interconnected in a control structure, where each control object is related to at least one corresponding data point and said selected process control element is related to more than one data point;
  select a number of data points for a group of control objects including said operator selected process control element according to a data point selection criterion;
  fetch process data values associated with the selected data points and with different control aspects, where the fetched process data values are process control data values associated with the process control element;
  present said process data values of the data points on the display, where each selected data point receives one corresponding presentation axis on which data values of this data point are presented and data values of data points that are associated with a common attribute are being linked together with a line between the values on the various parallel axes in the presentation;
  receive an operator selection of at least one further control object in the form of an alarm and event object;
  fetch data values of data points associated with the selected alarm and event object; and
  present the data values of the data points of the alarm and event object on a number of parallel axes, where each alarm or event object is represented by a corresponding line through each axis,
  wherein that the common attribute is time and the computer program code is further configured to cause an operator terminal to link the alarm and event data point values to corresponding process control data point values via a common time axis.

* * * * *